United States Patent [19]

Hell

[11] Patent Number: 4,728,385

[45] Date of Patent: Mar. 1, 1988

[54] APPARATUS FOR PRODUCING TEXTILE UNITS CONSISTING OF TEXTILE ARTICLES BONDED TO ONE ANOTHER

[75] Inventor: Günther Hell, Herford, Fed. Rep. of Germany

[73] Assignee: Herbert Kannegiesser GmbH & Co., Vlotho, Fed. Rep. of Germany

[21] Appl. No.: 870,265

[22] Filed: Jun. 3, 1986

[30] Foreign Application Priority Data

Jun. 3, 1985 [DE] Fed. Rep. of Germany ....... 3519871
Aug. 14, 1985 [DE] Fed. Rep. of Germany ....... 3529098

[51] Int. Cl.[4] ........................ G01N 21/22; B26D 5/20
[52] U.S. Cl. .................................... 156/353; 250/559
[58] Field of Search ............... 156/353, 355, 552, 522; 250/214 R, 214 AG, 221, 559

[56] References Cited

U.S. PATENT DOCUMENTS 3,902,813 9/1975 Broek ............................ 250/559 X
4,278,488 7/1981 Kopacz et al. ...................... 156/552

*Primary Examiner*—David A. Simmons
*Attorney, Agent, or Firm*—Sughrue, Mion, Zinn, Macpeak, and Seas

[57] ABSTRACT

In an apparatus for bonding strip-shaped textile articles, especially pieces of outer fabric (10) and interlining strips (11), the textile strips (14) formed by bonding the latter are divided into individual textile units (15) after leaving a heating and pressure device (13). For this purpose, the textile strip (14) is severed in the region between successive pieces of outer fabric (10) by means of a cutting knife (31). This is controlled by a measuring light barrier with a transmitter (36) and a receiver (40). The measuring light barrier is designed so that it can be adjusted automatically to different light-transmitting capacities of the materials (interlining strip 11).

10 Claims, 4 Drawing Figures

Figure 1:
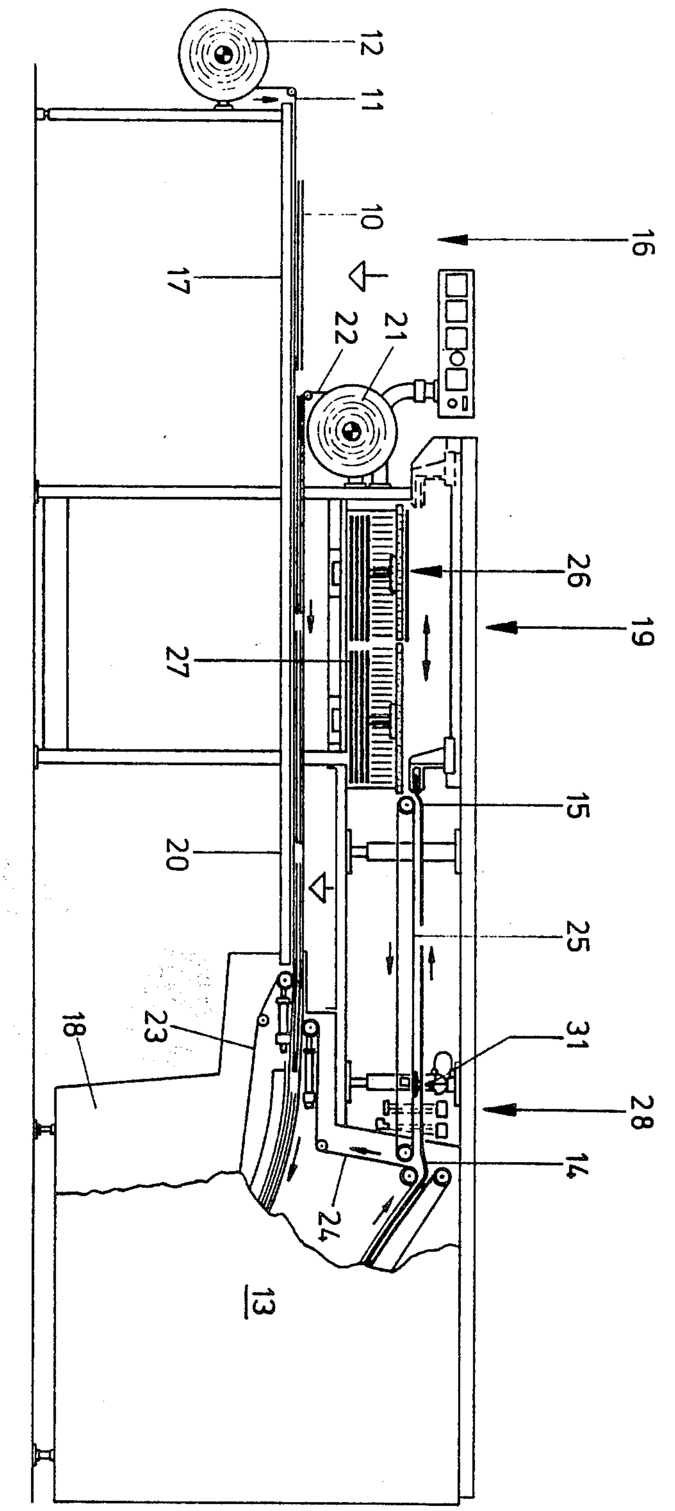

APPARATUS FOR PRODUCING TEXTILE UNITS CONSISTING OF TEXTILE ARTICLES BONDED TO ONE ANOTHER

The invention relates to an apparatus for producing textile units consisting of sheet-like textile articles bonded to one another, according to the preamble of claim 1.

Textile units bonded to one another and consisting of an outer fabric and an interlining are used in the manufacture of laundry articles and outer garments. The textile articles to be bonded together, in particular the interlinings, are provided with a coating which guarantees an adhesive bond as a result of the application of heat and pressure in a heating and pressure device.

The present invention is concerned with the production of elongate strip-shaped textile units, such as those used in or on the waistband of a pair of trousers, a skirt or the like, but also in (textile) belts.

To produce the bonded textile units, individual strip-shaped pieces of outer fabric cut to size are laid onto a continuous web-shaped interlining strip. These parts are then bonded to one another during continuous transport.

After the bonding, the textile units of limited length, necessary for further processing, are obtained from the textile strip formed in this way. For this purpose, following the heating and pressure device, the textile strips consisting of pieces of outer fabric and of web-shaped interlining strips, are severed by means of a cutting device in the region between successive pieces of outer fabric, so that ready-cut textile units true to length leave the apparatus (bonding press).

To control the cutting cevice, there is, for example, a light barrier (photocell) which measures the light-transmitting capacity of the textile strip issuing from the heating and pressure device, and which then controls the cutting device in such a way that the severing cut is always made between the particular pieces of outer fabric generally arranged at a distance from one another. The light barrier therefore measures the difference in transmitting capacity between the interlining strip alone and the interlining strip with a laid-on piece of outer fabric. Two important problems arise where this apparatus is concerned: in particular, when an interlining strip with pieces of outer fabric is introduced for the first time, the control or the light barrier does not yet "know" how great this difference will be. On the other hand, during operation, a change in the light-transmitting capacity or sensitivity of the apparatus occurs, for example as a result of soiling, so that it is no longer possible to detect clearly whether the sensed textile strip portion is part of the interlining strip or a part without a piece of outer fabric laid on it.

Starting from the abovementioned state of the art, the object of the present invention is, therefore, to develop an apparatus of the type mentioned in the introduction, in such a way that it is possible to achieve automatic adjustment of the sensing means.

To achieve this object, the apparatus according to the invention comprises regulating means which are connected to the sensing means for the automatic adjustment of the sensitivity of the latter.

Accordingly, the arrangement according to the invention guarantees that the device makes exact cuts from the very outset and that no faults arise, even during operation, as a result of changes which occur. The cutting device thus operates automatically, that is to say without manual intervention. Preferably, the regulating means comprise a peak-value memory which is connected, in particular via a controller, to a variable amplifier or the like, in such a way that the peak output amplitude of the sensing means is kept essentially constant. This design of the device guarantees that the signals obtained from the sensing means are standardized to a maximum value which is then kept constant during further operation. Thus, changes in the signal amplitude no longer affect the result during subsequent processing.

Advantageously, the regulating means include a comparator which compares the output voltage of the sensing means with a threshold voltage generated by a threshold generator controlled via the peak-value memory. This arrangement guarantees that the sensing level, at which, when it is reached, the decision "piece of outer fabric laid on/not laid on" is made, is also matched constantly to the sensitivity of the arrangement.

According to a further proposal of the invention, the sensing means have assigned to them, specifically following the latter in the conveying direction at a distance from them, a starting unit which responds to the front end of a textile strip supplied. The starting light barrier advantageously operating with a reflector responds to the front end of a new textile strip supplied, in such a way that the sensing means (measuring light barrier) are activated, their sensitivity being adjusted for the first time. During this first phase, therefore, the sensing means are then set to the light-transmitting capacity of the particular interlining strip delivered.

For this purpose, according to the invention, an initial strip of at least 25 cm is kept free of pieces of outer fabric. This adjustment portion of the interlining strip is necessary, so that the sensing means (measuring light barrier) adopt the particular sensitivity (or light intensity) required during the movement of the textile strip.

After the textile strip has been severed, the individual textile units are appropriately fed to a collector, especially to a stacker for forming individual stacks.

According to the invention, the cutting device is likewise designed in a special way. To make the severing cut, the textile strip is transported on a cutting conveyor (belt conveyor). Arranged above the latter is a cutting knife which is movable up and down and which interacts with a fixed counter-knife. This is arranged above the conveying strand of the cutting conveyor and is of approximately triangular cross-section. The textile strip is guided over and beyond the counter-knife, so that the severing cut can be made without damaging the cutting conveyor.

The apparatus can also be operated so that a continuous interlining strip is covered with a likewise continuous outer fabric strip, these strips then being connected to one another. In this case, the cutting device can be set to predetermined intervals.

An exemplary embodiment of the invention is explained in detail below with reference to the drawings.

Figure 2:
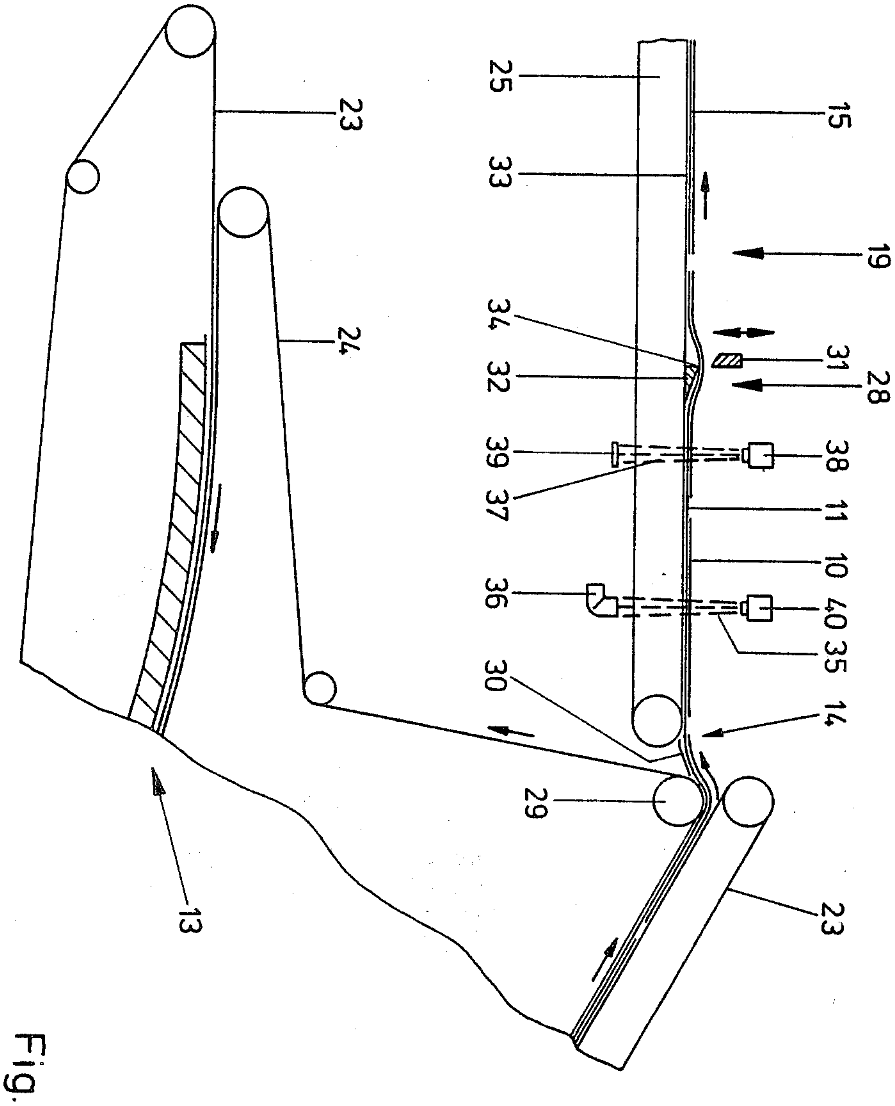
Figure 3:
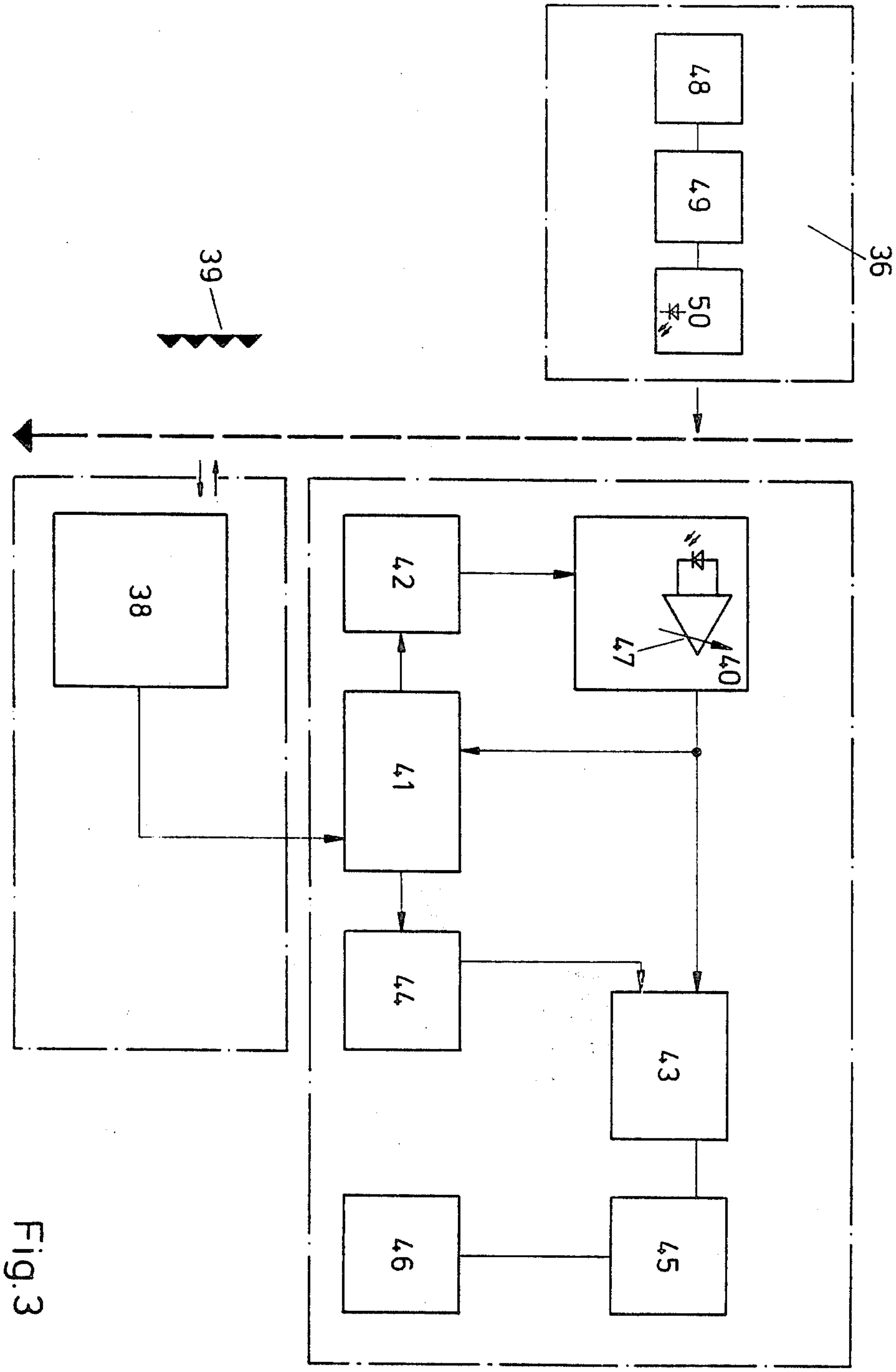
Figure 4:
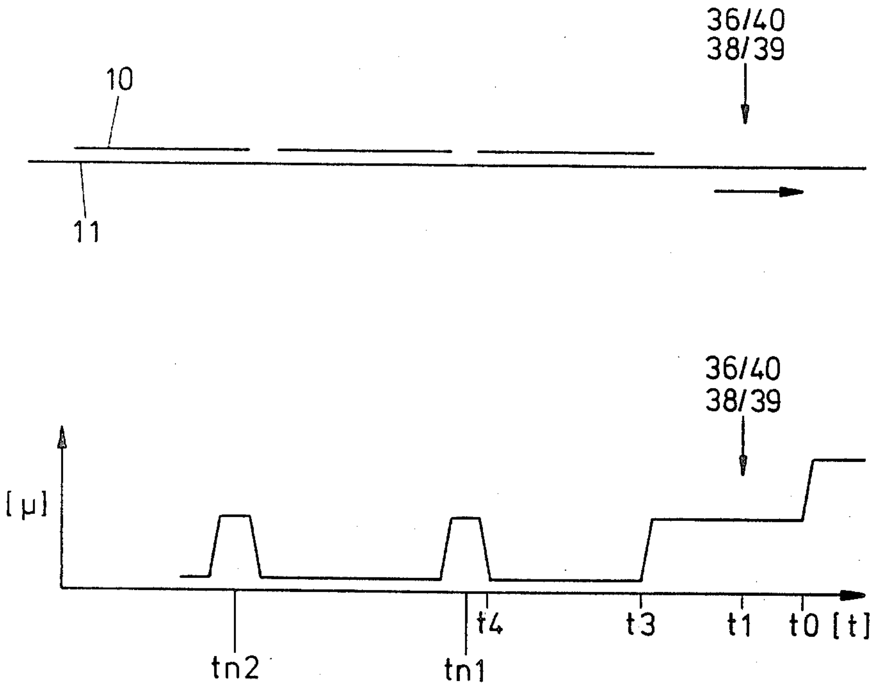

In the drawings:

FIG. 1 shows a diagrammatic side view of an apparatus for bonding strip-shaped textile articles, FIG. 2 shows the cutting device as a detail, again in a side view and on an enlarged scale, FIG. 3 shows a block diagram of a complete electronic circuit, and FIG. 4 shows a time diagram illustrating the operating cycle of the apparatus.

The apparatus illustrated as an exemplary embodiment in FIG. 1 serves for bonding textile articles, specifically elongate strip-shaped pieces of outer fabric 10 of limited length, to a web-shaped continuous interlining strip 11. The latter is conventionally provided with a suitable adhesive. The interlining strip 11 is drawn off from a (first) interlining roll 12 at a preferably continuous conveying speed. The pieces of outer fabric 10 are preferably laid onto the interlining strip 11 at a distance from one another of, for example, 10 mm or more. The composite textile element is then guided through a heating and pressure device 13. Inside this, pieces of outer fabric 10 and the interlining strip 11 are connected to one another by means of heat and pressure. The textile strip 14 formed in this way is severed in the region between successive pieces of outer fabric 10, thus producing textile units 15, consisting of a piece of outer fabric and a corresponding portion of the interlining strip. These textile units 15 are intended and are suitable for further processing, in particular in the manufacture of laundry articles, outer garments, belts, etc.

In the exemplary embodiment of FIG. 1, the apparatus (bonding press) consists of a (first) feed station 16, with a feed table 17, as a single unit, of the heating and pressure device 13 accommodated in a housing 18, as a further unit, and of a severing and collecting unit 19 arranged between the abovementioned units. The severing and collecting unit 19 contains a further (second) feed table 20. A second operator can be active in this region.

The interlining roll 12 for the interlining strip 11 is attached to the end face, that is to say the start of the feed table 16, specifically below a working plane of the feed table 17. In the region of the feed table 17 or 20, pieces of outer fabric 10 separately cut to size are laid successively onto the interlining strip 11. A further interlining roll 12 arranged at the end of the feed table 17 makes it possible to fabricate sandwich units. In this process, two pieces of outer fabric 10 are laid, above one another, onto the first lower interlining strip 11. Thereafter, in particular at the end of the feed table 17, a further upper interlining strip 22 is guided onto the composite structure from the interlining roll 21. The multi-layer (four-layer) continuous element is then conveyed into the heating and pressure device 13.

The heating and pressure device 13 is preferably designed in the way illustrated and described in FIG. 2 of Patent Application No. P 35 02 608. The individual members are nevertheless designed so that they are suitable for the conveyance and treatment of strip-shaped textile articles.

The composite units consisting of pieces of outer fabric 10 and interlining strip 11 and accordingly taken up by a first lower or outer conveyor 23 (belt conveyor), inside the housing 18, at the entrance of the heating and pressure device 13. On the opposite side, a counter-conveyor 24 is assigned to the conveying strand of the conveyor 23. The interlining strip 11 together with the pieces of outer fabric 10 is accordingly received between the mutually facing conveying strands of the conveyor 23 and counter-conveyor 24. In accordance with Patent Application No. P 25 02 608.1, the interlining strip and the pieces of outer fabric are guided past heating plates and pressure devices, with the result that a permanent durable connection is obtained between these textile articles during transport. The conveyor 23 and the counter-conveyor 24 are guided so that they pass out of the heating and pressure device 13 again on the side of the latter facing the feed station 16. The continuous strip now in the form of a textile strip 14 is transferred to a further conveyor, in particular a cutting conveyor 25 (belt), immediately following the conveyors 23, 24.

The textile strip 14 is severed in the region of the cutting conveyor 25, specifcally in the region of gaps formed between successive pieces of outer fabric 10. The textile units 15 obtained thereby, each consisting of a portion of the interlining strip and a piece of outer fabric bonded to the latter, are, in the present case, conveyed to a stacker 26. Here, individual stacks 27 of textile units 15 of this type are formed.

A cutting device 28 of special design is assigned to the cutting conveyor 25.

An advantageous exemplary embodiment of the cutting device 28 is illustrated on an enlarged scale in FIG. 2. The textile strip 14, here consisting only of one layer of interlining strip 11 with pieces of outer fabric 10 bonded to it, runs onto the cutting conveyor 25, in the region of the outlet side of the heating and pressure device 13, via a deflecting roller 29 of the counter-conveyor 24 and via a fixed guide 30.

The cutting device 28 is equipped with a cutting knife 31 movable up and down and arranged above the cutting conveyor 25. This cutting knife 31 is activated in the region between successive pieces of outer fabric 10, in order to sever the interlining strip 11. The pieces of outer fabric 10 are preferably at a distance from one another of 10 mm or more. The cutting knife 31 interacts with a fixed counter-knife 32. In the present case, this is arranged directly above a conveying strand 33 of the cutting conveyor 25 and is of approximately triangular cross-section.

An upward-directed edge acts here as a counter-cutting edge 34. The textile strip 14 is conveyed over and beyond the fixed counter-knife 32, that is to say is lifted off from the conveying strand 33 in this region.

Because of this, the severing cut can be made by the cutting knife 31, without the cutting conveyor 25 being damaged thereby.

Arranged in front of ths cutting knife 31 in the conveying direction are monitoring and checking devices, by means of which the cutting knife 31 is controlled according to the position of the pieces of outer fabric 10, so that the severing cuts are made exactly. For this purpose, contactless sensing means, in particular a "measuring light barrier" with a transmitter 36 and a receiver 40, are arranged at a distance in front of the cutting knife 31. The ray of light (light beam 35) emitted from the transmitter 36 passes through the entire, still unsevered textile strip 14, consisting of the interlining strip 11 and, if appropriate, several pieces of outer fabric 10, to the receiver 40. Instead of light, other electromagnetic radiation or ultrasonics (with suitable frequencies in each case) could, of course, also be used. The measuring light barrier 36/40 then generates a signal which is used to control the cutting knife 31. The associated circuit is explained in detail below (in a first preferred embodiment of the invention) with reference to FIG. 3.

As emerges from FIG. 3, the transmitter 36 consists of an oscillator 48 with a following driver 49 which activates a light-emitting diode 50. The signal generated in this way strikes the sensitive surface of a photodiode in a receiver 40 which has an amplifier 47 of variable gain. At the output of the receiver 40, the signal is fed to a comparator 43 on the one hand and to a peak-value memory 41 on the other hand. The peak-value memory 41 senses the signals coming from the receiver 40 and in a storage means retains the peak voltage value which occurs. According to this stored peak voltage value, the peak-value memory transmits an output signal to a controller 42 which regulates the gain of the variable amplifier 47 in the receiver 40, specifically in such a way that the peak voltage values (occurring successively) always remain essentially at the same level, even when a reduction in the sensitivity of the receiver 40 or a weakening of the signal coming from the transmitter 36 occurs over a relatively long period of time, for example as a result of soiling. As well as being connected to the controller 42, the peak-value memory 41 is also connected to a threshold generator 44. The threshold generator 44 generates a suitable threshold lying below the peak voltage value and transmits it to the second input of the comparator 43. When the output voltage of the receiver 40 falls below or exceeds the threshold from the threshold generator 44, the comparator 43 supplies an output signal. This output signal is transferred to an output stage 45 which is connected in a suitable way (not shown here) to the drive device for the cutting knife 31 and to a switch-state indicator 46. Thus, when a laid-on piece of outer fabric 10 passes into the beam path between the transmitter 36 and the receiver 40, the output signal at the receiver 40 drops and falls below the set threshold voltage. The comparator 43 then switches and activates the drive means of the cutting knife 31 via the output stage 45 and a suitable delay device (not shown here). The control of the cutting knife 31 can therefore be controlled either solely via the set transport speed or via a spatial arrangement of the measuring light barrier 36/40 in relation to the cutting knife 31 (when the spatial extent of the pieces of outer fabric 10 is known).

In a further preferred embodiment of the invention, there is also a "starting light barrier" which consists of a transmitting and receiving part 38 and a reflector 39, the transmitting and receiving part 38 being located above the textile strip 14 and the reflector 39 below the textile strip 14. Furthermore, the starting light barrier is arranged between the cutting knife 31 and the measuring light barrier 36/40 (see FIG. 2). As emerges from FIG. 3, the output signal from the transmitting and receiving part 38 is transferred to the peak-value memory 41. This apparatus operates as follows: when the apparatus is started up, the first piece of outer fabric 10 (or the first stack of pieces of outer fabric 10) is laid onto the interlining strip 11, in such a way that a leader of at least 25 cm is free of pieces of outer fabric 10. As shown in FIG. 4, the output signal from the (transmitting and) receiving part 38 is at the maximum level at the moment $t_0$, since the beam path is still undisturbed (before the entry of the interlining strip 11). As soon as the interlining strip 11 enters the light beam 37 of the transmitting and receiving part 38 or reflector 39, the output signal at the receiving part 38 drops. This is shown only at the moment $t_1$ in FIG. 4 for the sake of clarity. At this moment, only the interlining strip 11 is in the light beam 35 of the measuring light barrier 36/40 also. Thus, the two light barriers only sense the light-transmitting capacity of the interlining strip 11 (at various locations). The output signal from the starting light barrier 38/39, which is transmitted to the peak-value memory 41, switches the latter so that, when this signal appears (initiated by the flank at $t_0$), the peak-value memory 41 stores the output signal from the receiver 40 is a peak value. Each subsequent recurring peak value is thereafter set to this peak value, specifically by an appropriate adjustment of the sensitivity of the amplifier 47. After the first delivery of the interlining strip 11, the entire arrangement is adjusted for all subsequent operations.

When a piece of outer fabric 10 passes into the beam path of the measuring light barrier 36/40 during further operation (the moment $t_3$ in FIG. 4), the output level at the receiver 40 drops. As soon as the piece of outer fabric 10 leaves the beam path ($t_4$), the cutting device 31 is controlled at the moment $t_{n1}$, $t_{n2}$, etc., so that the interlining strip 11 is severed between two particular pieces of outer fabric 10 (or stack of these). This results, in the automatic way required, in the textile units 15 which can then be extracted from the apparatus. When the machine is started, the system is therefore set automatically to the degree of transmission of the new material supplied and also compensates process-related soiling of the optics when the machine is running.

I claim:

1. Apparatus for production of textile units comprised of sheet-like textile articles bonded to one another, in which strip-shaped outer fabric pieces are laid onto belt conveyed interlining fabric and, through heat and pressure from a heat and pressure means, are bonded to one another to form a continuous moving textile strip, wherein the textile strip, consisting of bonded textile pieces, is cut by a cutting apparatus in the interlining strip in the region between the successive pieces of outer fabric subsequent to the heat and pressure means, whereby the cutting apparatus is controlled through automatic sensing means (photocell), which senses the conveyed textile strips, thereby characterized, that regulating means (38/39, 41–43) are connected to sensing means (36/40) to provide for automatic adjustment of the sensitivity of said sensing means, and that said regulating means comprises a comparator (43), which compares the output voltage of the sensing means (36/40) with a signal generated by a peak value memory (41) controlled threshold signal generated (44).

2. The apparatus of claim 1, thereby characterized, that the regulating means comprises said peak value memory (41) connected through a controller (42) to a variable amplifier (47), so that the peak output amplitude of the sensing means (36/40) is kept essentially constant.

3. Apparatus according to claim 1, thereby characterized, that the sensor means (36/40), upon first sensing a textile strip, have sufficient startup data, particularly apparatus having a start light barrier (38/39) situated at a distance from the sensor means (36/40) for the initial setting of the sensor sensitivity of the sensor means (36/40) upon the first pass of the textile strip (14).

4. Apparatus according to claim 3, thereby characterized, that the sensing means comprises a light measure barrier (36/40).

5. An apparatus of claim 3, thereby characterized, that the start light barrier (38/39) is a reflection light barrier comprising a reflector (39) situated on the opposite side of the cutting conveyor belt (25).

6. Apparatus according to claim 3, thereby characterized, that the start light barrier (38/39) is situated in the area between the sensor means (36/40) and the cutting blade (31).

7. Apparatus according to claim 6, thereby characterized, that the start light barrier (38/39) may receive a lead strip of the textile strip (14) absent outer fabric piece (10) (simply as interlining strip), and will automatically set the measure light barrier (36/40) to the light transmissibility corresponding to the interlining strip.

8. Apparatus according to claim 7, thereby characterized, that the textile strip (14) in the carrying out of the cutting process is transportable on a cut conveyor (25), having the cutting blade (31) situated above this.

9. Apparatus according to claim 8, whereby characterized, that the up and down moveable blade (31) as well as the fixed blade (32) are situated immediately above the upper surface of a conveyor belt (33) of the cutting conveyor (25) and working in cooperation therewith, so that the textile strips (14) are removable after passing the fixed blade (32) and may be carried away by the upper surface of the conveyor belt (33).

10. Apparatus according to claim 9, thereby characterized, that the fixed blade (32) in cross section is approximately triangular with an upward facing countercutting edge (34).

* * * * *